United States Patent Office 3,070,514
Patented Dec. 25, 1962

3,070,514
PROCESS FOR THE MANUFACTURE OF
6-DEMETHYLTETRACYCLINE
Abramo Virgilio and Carlo Hengeller, Naples, Italy, assignors to Lepetit S.p.A., Milan, Italy
No Drawing. Filed May 4, 1961, Ser. No. 107,666
Claims priority, application Great Britain May 4, 1960
8 Claims. (Cl. 195—80)

This invention relates to a new fermentation process. More particularly, the invention is concerned with a process of preparations of the antibiotic 6-demethyltetracycline by fermentation.

It is known that while antibiotics in general have continuously grown in importance in the field of human therapy in the last years, the class of tetracycline antibiotics has got a preeminent position in the treatment of infective disease, due to the very broad antibacterial spectrum and to the comparatively low toxicity of its members.

6-demethyltetracycline represents one of the most recent steps in the studies concerning the antibiotics of the tetracycline class. It differs from tetracycline in lacking a methyl group at position 6 of the tetracycline molecule.

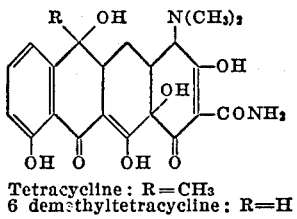

Tetracycline: R=CH$_3$
6 demethyltetracycline: R=H

Two ways have already been described for the production of 6-demethyltetracycline. The first process consists in fermenting certain mutant strains of *Streptomyces aureofaciens*.

The species *S. aureofaciens* is known to produce, under conventional fermentation conditions, the antibiotic chlortetracycline, while some carefully controlled modifications of the culture media lead to the simultaneous production of chlortetracycline and tetracycline.

A strict parallelism exists between the behavior of *S. aureofaciens* and the above mentioned mutant strains. These latter, when grown in a conventional culture medium, tend to produce the antibiotic substance 6-demethylchlortetracycline, while under controlled conditions 6-demethyltetracycline is simultaneously formed; in both cases, minor amounts of the antibiotics tetracycline and chlortetracycline are also formed. The sole production of 6-demethyltetracycline therefore implies a cumbersome and yield cutting procedure of separation from the related antibiotic substances.

Another known method for preparing 6-demethyltetracycline consists in catalytically hydrogenating 6-demethylchlortetracycline, thus involving a preliminary fermentation step for the production of 6-demethylchlortetracycline, which must be highly purified in order to isolate it from the related antibiotics formed in the course of the fermentation and then subjected to the hydrogenation.

The primary subject of this invention is the sole production of 6-demethyltetracycline by fermentation in conventional nutrient media of some induced mutants of *Streptomyces psammoticus* such as, for instance, a strain which is indicated in Lepetit's collection of culture as Cl. 7190. The strain Cl. 7190 has been deposited with the American Type Culture Collection under the number 14125.

Although the mutant Cl. 7190 in many characteristics resembles the parent strain, however, a differentiation appears evident when they are parallelly grown on several media. We give in the following a comparison of the growth characteristics of strain Cl. 2007, which is a wild type, and Cl. 7190, which is a mutant producing 6-demethyltetracycline, on various media incubated at 27–29° C.

For the determination of colors the Ostwald tables were used (Die kleine Farbmesstafel nach Ostwald, Ausgabe A, Wissenschaftlicher Verlag, Gattingen, Frankfurt, Berlin).

(1) STARCH-AGAR[a]

| | *Streptomyces psammoticus* | |
|---|---|---|
| | Strain Cl. 2007 | Strain Cl. 7190 |
| Growth | Poor | Very poor. |
| Aerial mycelium | Very poor, white becoming light olive buff (ie2) | Very poor, white becoming light olive buff (ie2). |
| Sporulation | Slight | Poor. |
| Diffusible pigment | Poor, light yellow (ga2) to light olive green (gel). | Poor, light brown (ge3). |
| Reverse | Light olive buff (ie1) | Brown (ge4). |
| Diastasic activity | Positive | Positive. |

[a] Prepared in accordance with the directions given in "Streptomyces Conference, Stockholm, 1958."

(2) CZAPEK AGAR SOLUTION[b]

| | *Streptomyces psammoticus* | |
|---|---|---|
| | Strain Cl. 2007 | Strain Cl. 7190 |
| Growth | Very poor | Very poor. |
| Aerial mycelium | Absent | Absent. |
| Sporulation | do | Do. |
| Diffusible pigment | do | Do. |
| Reverse | Colorless | Colorless. |

[b] Prepared according to T. G. Pridham et al., "A Selection of Media for Maintenance and Taxonomic Study of Streptomycetes," Antibiotics Annual, 1956-57, pp. 947-953.

(3) YEAST EXTRACT, MALT EXTRACT, AGAR[b]

| | *Streptomyces psammoticus* | |
|---|---|---|
| | Strain Cl. 2007 | Strain Cl. 7190 |
| Growth | Good | Good. |
| Aerial mycelium | Moderate, white to water green (ec1) to light olive buff (ie2). | White to water green (ec1) to light olive buff (ie2) |
| Sporulation | Slight | Very poor. |
| Diffusible pigment | Poor, yellow (ga2) to brown (ne3). | Brown (ie3). |
| Reverse | Dark brown (pg4) | Maroon brown (ie4). |

[b] Prepared according to T. G. Pridham et al., "A Selection of Media for Maintenance and Taxonomic Study of Streptomycetes," Antibiotics Annual, 1956-57, pp. 947-953.

(4) OAT FLAKES AGAR ACCORDING TO CARVAJAL[b]

| | *Streptomyces psammoticus* | |
|---|---|---|
| | Strain Cl. 2007 | Strain Cl. 7190 |
| Growth | Abundant | Abundant. |
| Aerial mycelium | White to water green (ec1) to green olive buff (le2). | White to water green (ec1) to green olive buff (le2). |
| Sporulation | Abundant | Abundant. |
| Diffusible pigment | Abundant, yellow (ga2) to maroon green-yellow (lc2). | Brown (ng3). |
| Reverse | Maroon green-yellow (ni2). | Dark maroon (pl4). |

[b] Prepared according to T. G. Pridham et al., "A Selection of Media for Maintenance and Taxonomic Study of Streptomycetes," Antibiotics Annual, 1956-57, pp. 947-953.

(5) OAT FLAKES TOMATO PASTE AGAR [b]

| | Streptomyces psammoticus | |
|---|---|---|
| | Strain Cl. 2007 | Strain Cl. 7190 |
| Growth | Moderate | Moderate. |
| Aerial mycelium | Poor, white to water green (ec1) to light olive buff green (le2) | Poor, white to water green (ec1) to light olive buff (le2). |
| Sporulation | Poor | Poor. |
| Diffusible pigment | Moderate, yellow to brown (gc3). | Moderate, brown (ec3). |
| Reverse | Brown (le5) | Light brown (le3) to dark brown (le5). |

[b] Prepared according to T. G. Pridham et al., "A Selection of Media for Maintenance and Taxonomic Study of Streptomycetes," Antibiotics Annual, 1956–57, pp. 947–953.

(6) GLYCEROL ASPARAGINE AGAR [a]

| | Streptomyces psammoticus | |
|---|---|---|
| | Strain Cl. 2007 | Strain Cl. 7190 |
| Growth | Poor | Poor. |
| Aerial mycelium | Very poor, white | Absent. |
| Sporulation | Absent | Do. |
| Diffusible pigment | Very poor, light yellow (ia2). | Very poor, pinkish brown (gc4). |
| Reverse | Brown (lc3) | Light yellow (ec3) with darker spots (pl4). |

[a] Prepared in accordance with the directions given in "Streptomyces Conference, Stockholm, 1958."

(7) GLYCEROL GLYCINE AGAR [a]

| | Streptomyces psammoticus | |
|---|---|---|
| | Strain Cl. 2007 | Strain Cl. 7190 |
| Growth | Moderate to good | Good. |
| Aerial mycelium | Poor, white to water green (ec1) to light olive buff (le2). | Poor, white with spots from water green (ec1) to light olive buff (le2). |
| Sporulation | Very poor | Poor. |
| Diffusible pigment | Poor (ne3) | Moderate brown (pl4). |
| Reverse | Dark maroon | Deep maroon (pl5). |

[a] Prepared in accordance with the directions given in "Streptomyces Conference, Stockholm, 1958."

(8) GLUCOSE ASPARAGINE MEAT EXTRACT AGAR [b]

| | Streptomyces psammoticus | |
|---|---|---|
| | Strain Cl. 2007 | Strain Cl. 7190 |
| Growth | Moderate | Moderate. |
| Aerial mycelium | Poor, white with water green (ec1) spots. | Poor, white. |
| Sporulation | Very poor | Absent. |
| Diffusible pigment | Practically absent | Light brown (gc4). |
| Reverse | Light avana brown (ic3) | Brown (ge5). |

[b] Prepared according to T. G. Pridham et al., "A Selection of Media for Maintenance and Taxonomic Study of Streptomycetes," Antibiotics Annual, 1956–57, pp. 947–953.

(9) CALCIUM MALATE AGAR

| | | |
|---|---|---|
| Calcium malate | g | 10.0 |
| $NH_4Cl$ | g | 0.5 |
| $K_2HPO_4$ | g | 0.5 |
| Agar | g | 18.0 |
| Dist. water, q.s. to | ml | 1,000 |

Post sterilization, pH 6.4 to 6.6.

| | Streptomyces psammoticus | |
|---|---|---|
| | Strain Cl. 2007 | Strain Cl. 7190 |
| Growth | Very poor | Very poor. |
| Aerial mycelium | Absent | Absent. |
| Sporulation | do | Do. |
| Diffusible pigment | do | Do. |
| Reverse | Colorless | Colorless. |
| Calcium malate digestion | Negative | Negative. |

(10) GELATIN

| | | |
|---|---|---|
| Gelatin, Difco | g | 120 |
| Meat, extract, Difco | g | 3 |
| Peptone, Difco | g | 5 |
| Dist. water, q.s. to | ml | 1,000 |

Post sterilization, pH 6.7 to 6.8.

| Strain Cl. 2007 | Strain Cl. 7190 |
|---|---|
| Poor growth. Vegetative mycelium hyaline. Aerial mycelium absent. Very poor liquefaction, limited to the zone immediately below the culture. | Poor growth. Vegetative mycelium pale brown. Aerial mycelium absent. Very poor liquefaction, limited to the zone immediately below the culture. Very poor light brown soluble pigment. |

The test for the production of melanoid pigment, carried out according to Ettlinger et al., Archiv. für Mikrobiologie 31, 326 (1958), and the test for the production of hydrogen sulfide, carried out according to Tresner and Danga, J. Bact. 76, 239 (1958), gave negative results for both strains.

A microscopic morphological observation of the two strains was carried out on cultures in starch agar plates after incubation of 20 days at 28° C. The morphological characteristics were found to be identical and may be summarized as follows:

Sporophores: straight or slightly waved (Sectio: Rectus Flexibilis according to Pridham, Hesseltine et al., Applied Microbiology 6, 52–79 (1958)), sometimes with open irregular bendings.

Spores: smooth, generally cylindrical (1.5–6 x 1.0–1.3μ).

Vegetative mycelium: the breath of hyphae is about 0.5μ.

One of the simplest procedure to carry out the process of the invention is described in the following, although any other conventional procedure may give comparable results. The microorganism Str. psammoticus Cl. 7190 is grown in submerged culture under conditions practically similar to those which permit the production of tetracycline using Str. psammoticus, Cl. 2007, and which we described in "Il Farmaco," Sci. Ed. XV (3), 168, 1960. The examples I to V are illustrative of the fermentation process. At the end of the fermentation the broth is acidified to a pH of about 1.5 to solubilize the antibiotic and filtered to free the clear solution from the mycelium. The filtrate is then made alkaline to pH about 8.5–9.0 and extracted with a water immiscible lower aliphatic alcohol, such as butanol. The organic extract is extracted in turn with a dilute mineral acid, such as hydrochloric or sulfuric acid, and the water extract is evaporated in vacuo at a temperature not exceeding 25° C. to a small volume and adjusted to pH about 5.0.

The yellowish precipitate which forms is collected, washed and dried in vacuo. This product consists of almost pure 6-demethyltetracycline.

For analytical purposes a sample of 1–2 drops may be taken off from the filtered broth at the end of the fermentation and subjected to a chromatographic analysis by the descending technique using strips of paper Whatman No. 1 and water saturated butanol as the solvent. The development is carried out by allowing the strips to stand at 20° C. for 18–20 hours. After evaporation of the solvent the strips are placed on plates containing nutrient agar seeded with spores of B. cereus var. mycoides ATCC 9634. The plates are incubated at 32° C. for 12–14 hours. A single zone of inhibition is always apparent with the Rf value 0.30, identical with the known Rf value of 6-demethyltetracycline. Under the described conditions tetracycline hydrochloride has Rf 0.37, 6-demethylchlortetracycline hydrochloride has Rf 0.47 and chlortetracycline hydrochloride has Rf 0.59.

It will be appreciated that no provision is given in Examples I to III for lowering the common chloro ion concentration of the selected culture media. However, as indicated in Examples IV and V, fermentations have also been carried out in the presence of substantial amounts of intentionally added chloro or bromo ions. The result was in any case the same, and 6-demethyltetracycline was always the sole antibiotic substance produced.

Example I

A 500 ml. flask containing 100 ml. of the following culture medium:

| | | |
|---|---|---|
| Peptone | g— | 10.0 |
| Constantino meat extract | g— | 1.0 |
| Dextrose | g— | 20.0 |
| $K_2HPO_4$ | g— | 1.0 |
| $MgSO_4 \cdot 7H_2O$ | g— | 0.2 |
| Tap water, q.s. to | ml— | 1,000 |

Before sterilization, pH 7.1 (sterilization 20 minutes at 120° C.).

was inoculated with a spore suspension of *S. psammoticus* Cl. 7190 from a slant culture on Carvajal's oak flakes agar. The culture was incubated for 36 hours at 28° C. on a reciprocating shaker operated at 100 cycles per minute.

The whole content of the flask was used to inoculate a 10 litres glass prefermentor containing 4 litres of the following culture medium:

| | | |
|---|---|---|
| Soybean meal | g— | 5.0 |
| Corn steep liquor | g— | 15.0 |
| Cerelose | g— | 35.0 |
| $(NH_4)_2SO_4$ | g— | 6.0 |
| $KH_2PO_4$ | g— | 0.2 |
| $MgSO_4 \cdot 7H_2O$ | g— | 0.2 |
| $CaCO_3$ | g— | 6.0 |
| Tap water, q.s. to | ml— | 1,000 |

Before sterilization, pH 7.0 (sterilization 20 minutes at 120° C.).

This culture was inoculated at 28° C. with stirring at 750 r.p.m. and introducing sterile air at a rate of 0.75 v./v./min. After 18–20 hours this subculture was ready for transfer. The mycelium showed short hyphae, slightly branched. Two hundred milliliters were used to inoculate a 10 litres fermentor containing 4 litres of fermentation medium having the following composition:

| | |
|---|---|
| | g. |
| Corn steep liquor | 30.0 |
| $(NH_4)_2SO_4$ | 9.0 |
| Cerelose | 66.0 |
| $MgSO_4 \cdot 7H_2O$ | 1.0 |
| $K_2CO_3$ | 0.8 |
| $CaCO_3$ | 9 |

Post sterilization, pH 6.8–6.9 (sterilization 20 minutes at 120° C.).

The fermentation was carried out at 28° C. with stirring at 750 r.p.m. and aeration of 0.75 v./v./min. The duration of fermentation was 80–85 hours.

The antibiotic activity as determined on the harvest and expressed in 6-demethyltetracycline was 760γ/ml.

6-demethyltetracycline was the only antibiotic present in the fermentation broth.

Example II

With 200 ml. of a subculture prepared in Example I and using a strain of *Str. psammoticus* capable of producing 6-demethyltetracycline, a 10 litres fermentor containing 4 litres of the following culture medium was inoculated:

| | | |
|---|---|---|
| Peanut meal | g— | 30 |
| Cerelose | g— | 66 |
| $MgSO_4 \cdot 7H_2O$ | g— | 1.0 |
| $(NH_4)_2SO_4$ | g— | 9.0 |
| $KH_2PO_4$ | g— | 0.1 |
| $K_2CO_3$ | g— | 0.8 |
| $CaCO_3$ | g— | 9.0 |
| Tap water, q.s. to | ml— | 1,000 |

Post sterilization, pH 6.9 (sterilization 30 minutes at 120° C.).

The fermentation was carried out at 28° C. with stirring at 750 r.p.m. and an aeration of 0.75 v./v./min. The duration of fermentation was 80–85 hours.

The antibiotic activity as determined on the harvest and expressed in 6-demethyltetracycline was 1080γ/ml.

The paper chromatography confirmed that 6-demethyltetracycline was the only antibiotic present in the fermentation broth.

Example III

With 200 ml. of a subculture prepared as described in Example I a 10 litres fermentor containing 4 litres of the following culture medium was inoculated:

| | | |
|---|---|---|
| $(NH_4)_2SO_4$ | g— | 10 |
| Cerelose | g— | 55 |
| $CaCO_3$ | g— | 8 |
| $KH_2PO_4$ | g— | 0.15 |
| $MgSO_4 \cdot 7H_2O$ | g— | 0.25 |
| $ZnSO_4 \cdot 7H_2O$ | mg— | 75 |
| $FeSO_4 \cdot 7H_2O$ | mg— | 40 |
| $MnSO_4 \cdot 4H_2O$ | mg— | 50 |
| Tap water, q.s. to | ml— | 1,000 |

Post sterilization, pH 6.9 (sterilization 20 minutes at 120° C.).

The fermentation was carried out at 28° C. with stirring at 750 r.p.m. and aeration of 0.75 v./v./min. The duration of fermentation was 80–85 hours. The antibiotic activity in 6-demethyltetracycline was 260γ/ml. The paper chromatography confirmed that 6-demethyltetracycline was the only antibiotic present in the fermentation broth.

Example IV

To prove that the production of demethyltetracycline from *S. psammoticus*, Cl. 7190, is independent of the concentration in chloro ion of the fermentation medium, the following experiment was carried out.

Under the same conditions as described in Example II, but with the addition to the fermentation medium of NaCl in a proportion of two grams/liter a produuction of 950γ/ml. of 6-demethyltetracycline was obtained.

The chromatographic analysis on the harvest confirmed that 6-demethyltetracycline was the only antibiotic present in the broth.

Example V

To prove that the production of demethyltetracycline from *St. psammoticus*, Cl. 7190, is independent of the concentration in bromo ion of the medium the following experiment was carried out: under the same conditions as described in Example II but with the addition to the fermentation medium of NaBr in a proportion of 2 g./litre a production of 350γ/ml. of 6-demethyltetracycline was obtained.

The chromatographic analysis on the harvest confirmed that 6-demethyltetracycline was the only antibiotic present in the broth.

Example VI

Extraction of 6-demethyltetracycline from the fermentation broth. Ten litres of harvest broth containing 810γ/ml. of 6-demethyltetracycline were acidified at pH 1.5 with concentrated HCl and filtered from the mycelium.

The mycelium was suspended twice in a water volume corresponding to one-fifth of the harvest volume and then filtered.

The washings were added to the filtered broth and the mixture (12.75 litres) was alkalized to pH 8.8 with 10% NaOH and then extracted with 2.5 litres of butanol.

1.5 litres of butanol having an activity of 3090γ/ml. in 6-demethyltetracycline were obtained.

The rich butanol was extracted four times at pH 1.5 with 300 ml. portions of dilute sulfuric acid.

The aqueous extracts (1200 ml.) having a content of 3100γ/ml. of 6-demethyltetracycline were concentrated in vacuo at 25° C. to a volume of 400 ml. and then adjusted to pH 5 with 10% NaOH.

A yellow product precipitated and was filtered, washed, and dried in vacuo at 50° C. A product (3.2 g.) was obtained assaying 976γ/mg. as 6-demethyltetracycline sulfate.

We claim:
1. A process for producing 6-demethyltetracycline, which comprises cultivating a microorganism of the class consisting of *Streptomyces psammoticus*, ATCC 14125, and its mutants and variants in an aqueous nutrient medium under aerobic submerged conditions until substantial antibiotic activity is imparted to said medium and recovering the antibiotic activity from the medium.

2. A process for producing 6-demethyltetracycline, substantially free from 6-demethylchlorotetracycline, which comprises cultivating a microorganism of the class consisting of *Streptomyces psammoticus*, ATCC 14125, and its mutants and variants in an aqueous nutrient medium under aerobic submerged conditions until substantial antibiotic activity is imparted to said medium and recovering the antibiotic activity from the medum.

3. A process for producing 6-demethyltetracycline, which comprises growing under aerobic conditions a culture of a microorganism of the class consisting of *Streptomyces psammoticus* ATCC 14125, and its mutants and variants in an aqueous medium having a pH between 4 and 8, containing a soluble carbon source, a source of assimilable nitrogen and essential mineral salt at a temperature between 25° and 37° for a period of 36 to 120 hours and recovering 6-demethyltetracycline from the medium.

4. A process for producing 6-demethyltetracycline which comprises growing under aerobic submerged conditions a culture of *Streptomyces psammoticus*, ATCC 14125, in an aqueous medium having a pH between 4 and 8 and containing a soluble carbon source, a source of assimilable nitrogen and essential mineral salts at a temperature of about 28° for a period of 70–90 hours and recovering 6-demethyltetracycline from the medium.

5. A process for recovering 6-demethyltetracycline which comprises acidifying the fermentation medium of a microorganism of the class consisting of *Streptomyces psammoticus*, ATCC 14125, and its mutants and variants, filtering to clear the solution from mycelium, adjusting the filtrate to alkaline pH, extracting with a water immiscible organic solvent, extracting the organic phase with a dilute mineral acid, evaporating the water extract in vacuo at a temperature not exceeding 25° to a small volume, adjusting to pH about 5.0 and collecting the precipitate so obtained.

6. A process as in claim 5 in which the organic extraction solvent is butanol.

7. A process as in claim 5 in which the fermentation broth, filtered from the mycelium, is adjusted to pH 8.5–9.0.

8. A process as in claim 5, in which the mineral acid used to extract the organic phase is sulfuric acid.

References Cited in the file of this patent
UNITED STATES PATENTS
2,878,289  McCormick et al. ———————— Mar. 17, 1959